K. FRITSCH & J. FORSTER.
Telescope.
No. 214,501. Patented April 22, 1879.
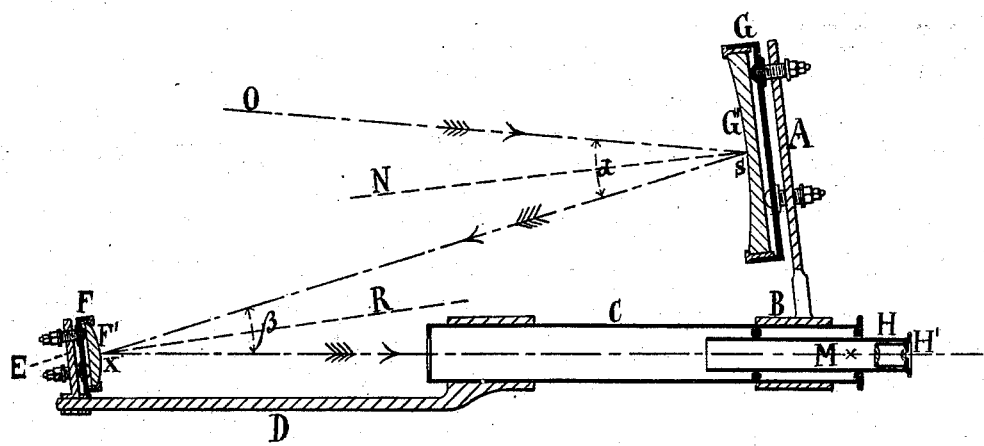

UNITED STATES PATENT OFFICE.

KARL FRITSCH AND JOSEPH FORSTER, OF VIENNA, AUSTRIA, ASSIGNORS OF ONE-THIRD THEIR RIGHT TO KOCH BROTHERS, OF STUTTGART, WÜRTEMBERG.

IMPROVEMENT IN TELESCOPES.

Specification forming part of Letters Patent No. 214,501, dated April 22, 1879; application filed December 18, 1877.

*To all whom it may concern:*

Be it known that we, KARL FRITSCH and JOSEPH FORSTER, of the city of Vienna, in the Empire of Austria, have invented new and useful Improvements in Telescopes, of which the following is a specification.

In the ordinary construction of telescopes heretofore employed, the small and large mirror—that is to say, the reflector and object-mirror—were mounted within the telescope to avoid the effect of detrimental rays of light in the observations. We have found, however, that without impairing the power of the instrument both these mirrors may be located outside of the tube when properly arranged, by which arrangement the instrument may be made smaller, lighter, cheaper, and more portable than heretofore.

In the accompanying drawing, showing a section of a telescope constructed according to our invention, C is a short tube, carrying within the usual eye-piece H′ and a standard, B, supporting a plate, A, the standard being connected with the tube by means of a sleeve or other suitable means. The plate A supports a frame, G, which carries the large object-mirror G′, which may be adjusted relatively to the object to be reflected by three set-screws, which connect the frame with the standard-plate A. This mirror is supported upon the tube at a point near the eye-piece, and upon the opposite end of the tube is mounted, by means of a sleeve or otherwise, a supporting-bar, D, carrying a plate, E, which, like plate A, supports a frame, F, within which the small reflector F′ is mounted, and the latter, like mirror G′, may be adjusted by means of set-screws.

The mirrors are preferably made of polished glass and silvered in the usual manner. Their surfaces may be spherical or parabolical, or the small mirror may have a concave, convex, or plane surface.

When the mirror G′ has been adjusted relatively to the object to be viewed and the small mirror relatively to the large one, and supposing the object to be viewed to be at O, the large mirror is facing said object and the small one the eye-piece and large mirror, the optical effect being as follows: The ray falling from the object onto the center $s$ of the large mirror will not be reflected on the normal line N, but at an angle with such line and with the line O $s$ upon the center $x$ of the small mirror, and in a similar manner the image reflected by the small mirror is not reflected on the normal line R, but at an angle to said line, as well as to that of line $s\,x$, so that the reflected image may be viewed through the eye-piece.

It will thus be seen that the ray O $s$ forms a determined angle, $d$, with the reflected ray $s\,x$, and the ray $x$ M also forms a determined angle with the ray $s\,x$.

It will also be observed that the large mirror is not perforated as usual, and in this manner the most effective part of it is preserved; nor does the small mirror lie in the normal line of the center of the large mirror, by which arrangement the best part of the latter may be made use of.

Having now described our invention, what we claim, and desire to secure by Letters Patent, is—

1. In a telescope, an object-mirror and a reflector located outside of the tube, the former at right angles therewith at or near the eye-piece above the tube, and the latter facing the tube, substantially as described, for the purpose specified.

2. A telescope having its object-mirror and reflector mounted upon the tube in the manner and for the purpose substantially as shown and described.

In testimony whereof we have signed our names to this specification in the presence of two subscribing witnesses.

K. FRITSCH.
JOSEPH FORSTER.

Witnesses:
C. V. PUGET,
T. BARTA.